Figure 1:
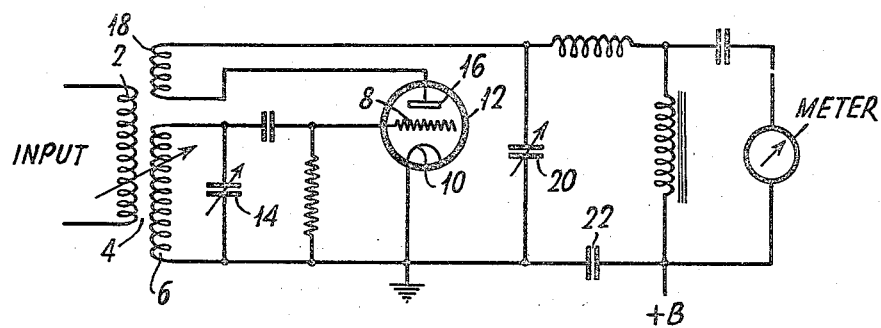

July 8, 1941.  L. J. McKESSON  2,248,770

MODULATION METER

Filed June 8, 1938

INVENTOR
L. J. McKESSON
BY
ATTORNEYS

Patented July 8, 1941

2,248,770

UNITED STATES PATENT OFFICE 2,248,770

MODULATION METER

Lewis J. McKesson, Rocky Point, N. Y., assignor to Radio Corporation of America, a corporation of Delaware Application June 8, 1938, Serial No. 212,431

2 Claims. (Cl. 179—171.5)

This application concerns a method of and means for measuring percentage modulation on phase, frequency, or amplitude modulated carrier waves or waves modulated with combinations of the above types of modulation.

In describing my invention reference will be made to the attached drawing wherein, Figures 1 and 2 each show different circuit arrangements adapted to use in accordance with the present invention for measuring percentage modulation of wave energy modulated in any manner.

The measurement of percentage modulation on a carrier wave which is amplitude modulated is comparatively simple by means of several known methods most of which utilize the principle of rectification before measurement. Such methods are not directly applicable to phase or frequency modulation. In order to measure phase or frequency modulation by heretofore known methods, a special receiver is required which uses one of the several methods of detecting such modulation and calibrating this receiver is required in terms of output versus the carrier level. Such arrangements are cumbersome and subject to considerable error due to changes in calibration from time to time.

This invention can be used on any simple oscillating detector or separate heterodyne type of receiver and can be used without previous calibration except for a calibration of the audio frequency circuits of the receiver versus frequency over a comparatively small range. Even this required calibration can be eliminated by taking the measurements in a certain manner.

The principle on which the operation of this system of measuring various types of modulation is as follows:

If two unmodulated radio frequency waves, are adjusted in frequency to "zero beat" and the combined two waves passed through a detector the resultant output will be zero. However, if one of these carriers (in practice it will be the weaker one) is modulated either by phase, frequency, or amplitude modulation, the resultant output from the detector is no longer zero but will have an amplitude which is due to a beat note between the unmodulated carrier and the side bands of the modulated carrier. The amplitude of this output can be made directly proportional to the amplitude of the side bands for any type of modulation and will be of a frequency equal to that of the modulation frequency. That is by adjusting the phase angle between the two sources of energy, the output can be made responsive to either phase and frequency modulation or to amplitude modulation. Phase and frequency modulated waves have side frequencies whose strength measures the amount of modulation and whose strength is measured by the beat method described above. A substantially 90° shift in oscillation phase is required to cause the beats of the side frequencies with the oscillations to add rather than oppose in the meter when phase or frequency modulation is being analyzed. Now if the stronger unmodulated carrier has its frequency adjusted to differ from the other carrier by some certain amount, for instance 1000 cycles, a beat note will be produced in the output of the detector whose main frequency is 1000 cycles and whose amplitude will be directly proportional to the amplitude of the carrier being measured. Now if the ratio of the detector output with one carrier modulated and the carriers tuned to zero beat is taken to that when the carriers are not tuned to zero beat this ratio will be the same relative ratio as the amplitude of the modulated carrier to that of its side bands which in turn is a measure of the percentage modulation. By means of adjusting the phase angle the phase or frequency modulation and the amplitude modulation percentages can be measured independently.

For practical purposes the method of measuring percentage modulation would be as follows:

Any simple type of receiver may be used which is capable of providing a local carrier wave which may be adjusted to zero beat or to heterodyne the modulated wave to be measured. This action of heterodyning may take place at the original carrier frequency as in the simplest form of receiver or may take place at some low frequency obtained through the use of a superheterodyne receiver.

Figure 2:
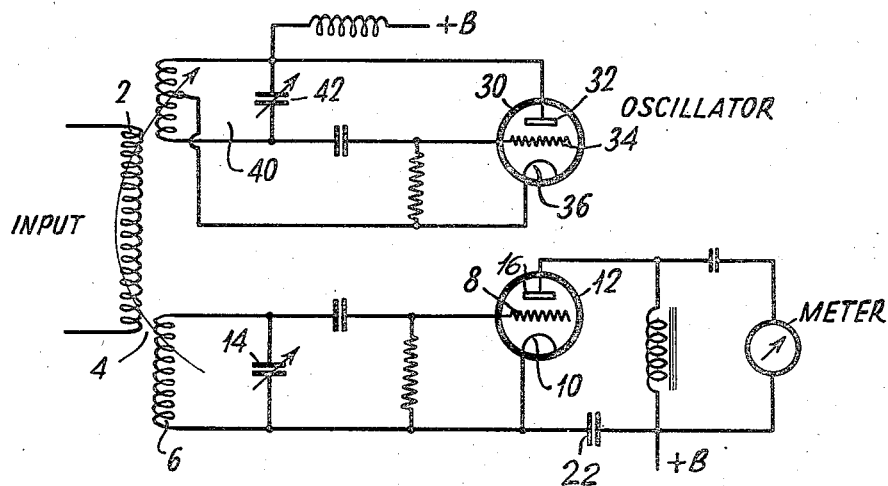

In Figures 1 and 2 I have shown detector circuits appropriate for use in my novel method. In each of these circuits wave energy modulated in phase or frequency or amplitude is supplied to the primary winding 2 of a transformer 4 having a secondary 6 coupled to the control grid 8 and cathode 10 of an electron discharge device 12. The secondary 6 may be tuned by a variable condenser 14. In Figure 1 the anode 16 of tube 12 is coupled by a feedback reactance 18 to the transformer 4 to produce regeneration and this regeneration is carried to an extent such that 12 oscillates to produce oscillations therein to beat with the received wave energy impressed on 2. The frequency and phase relationship of the produced oscillation to the input wave may be changed by adjusting 14. Regeneration may be controlled by a variable condenser 20. The output connected by way of radio frequency choke and coupling condenser 22 may be fed to any current meter of appropriate type. In Figure 2 an additional electron discharge device 30 having its anode 32, grid 34, and cathode 36 is connected in an oscillating circuit 40 including a frequency determining and adjusting condenser 42. By tuning condenser 42 the oscillations produced in 30 may be made of a frequency equal to the frequency of the wave received at 2 so that zero beat output is obtained or of a different frequency so that a beat frequency output is obtained.

With the local oscillator or detector oscillating at a frequency the same as that of the modulated wave to be measured, i. e., zero beat, the audio frequency output of the receiver is measured by means of a decibel meter or similar device. The phase relationship is adjusted to zero for amplitude modulation determinations and plus or minus 90° for phase or frequency modulation determinations. This relative phase displacement in the case of phase or frequency modulated waves is necessary because in phase and frequency modulation the phase relation of the carrier and its side bands is different than the phase relation of a carrier and its side bands resulting from amplitude modulation. Without the phase displacement of substantialy 90° the side bands of phase or frequency modulated waves would oppose rather than add. The local oscillator or detector is then tuned so as to give a beat note between the two carriers and the output of the receiver again measured. The ratio of these two measurements will then give directly the percentage of modulation of the wave which was to be measured.

Since in measuring modulation of a steady tone modulation the beat note obtained when measuring the carrier can be made the same frequency as that of modulation, any difference in the audio frequency response of the receiver will be nullified if the two frequencies measured are the same.

I claim:

1. The method of determining the percentage modulation of modulated wave energy comprising a carrier and side frequencies which consists in, beating said modulated wave energy with oscillatory energy of a frequency equal to the frequency of said carrier and demodulating the energy resulting from said beating to produce resultant current, beating the carrier wave of said modulated wave energy with oscillatory energy of a frequency differing from the frequency of the carrier wave of said modulated wave energy by a beat frequency to produce energy of said beat frequency, demodulating said energy of said beat frequency to produce other resultant current and comparing said resultant currents to determine the percentage modulation of said modulated wave energy.

2. The method of determining the percentage modulation of wave energy modulated in phase or frequency at signal frequency which consists in, beating modulated wave energy with oscillatory energy of a frequency differing from the mean frequency of said modulated wave energy by a beat frequency to produce energy of said beat frequency and demodulating said energy of said beat frequency to produce resultant current, beating the modulated wave energy with oscillatory energy of a frequency equal to the mean frequency of the modulated wave energy, demodulating the energy resulting from said last beating action to produce resultant current, adjusting the phases of the energies used in the last beating process so that the demodulation components add, and comparing the two resultant currents to determine the percentage modulation of said phase or frequency modulated wave energy.

LEWIS J. McKESSON.